Patented June 11, 1940

2,204,194

UNITED STATES PATENT OFFICE 2,204,194

ALKYLATION PROCESS

Eldon E. Stahly and Erwin M. Hattox, Baton Rouge, La., assignors to Standard Oil Development Company, a corporation of Delaware No Drawing. Application November 25, 1938, Serial No. 242,275

17 Claims. (Cl. 196—10)

This invention relates to improvements in the process of alkylation of paraffins and pertains, more particularly, to the production of saturated hydrocarbons boiling within the motor fuel boiling range.

It has heretofore been proposed to produce such hydrocarbon mixtures by polymerization of normally gaseous mono-olefins followed by hydrogenation of the olefinic polymers to produce a saturated motor fuel. These polymerization reactions have been carried out using $H_3PO_4$, $H_2SO_4$ or mixtures of these two acids. It is known to react a mixture containing isobutane and isobutene in the presence of aluminum chloride and hydrogen chloride to produce saturated branched chain alkylation products for incorporation in gasoline. It is also known to carry out this type of reaction in the presence of concentrated sulfuric acid. Not only has it been possible to alkylate isobutane with normally gaseous mono-olefins, but it is known to alkylate such isoparaffins with the polymers of such olefins, that is, the dimers, trimers, etc., using highly concentrated sulfuric acid as the catalyst.

It is an object of the present invention to produce an increased yield of motor fuel, particularly as to constituents having a high octane number and boiling within the gasoline range, by alkylating mixtures containing isoparaffins and mono-olefins either in the form of monomers or polymers in the presence of novel alkylation catalysts.

It is a further object of the present invention to produce an increased yield of motor fuel, particularly as to octane constituents, boiling within the gasoline range and having an unexpectedly high octane value.

It is a still further object of this invention to produce greater quantities of aviation fuels by the reaction of isobutane with isobutylene polymers or copolymers with normal butylenes rather than resorting to straight polymerization followed by the conventional hydrogenation reaction.

It has been proposed and found to be highly feasible to react paraffinic hydrocarbons with olefins to produce saturated hydrocarbons boiling within the desired motor fuel range. This reaction has been denoted as alkylation. It is readily apparent that a saturated branched chain normally liquid paraffin may be produced directly by the alkylation of a normally gaseous branched chain paraffin, for example, isobutane, by treating such a compound with a normally gaseous mono-olefin without the necessity of including a hydrogenation treatment in the process as would be the case in using a polymerization process. An alkylation process has advantages in that gaseous reactants, ordinarily burned as gas for heating purposes, are reacted to produce more useful products. Large supplies of field butanes, refinery $C_4$ cuts, cracking coil gases, gases from debutanizer units, etc., afford highly desirable sources of supply of the reactants used. However, it is to be distinctly understood that the invention is not limited to any particular source of supply of the reactants. It is only essential that an isoparaffin from any suitable source be contacted with a mono-olefin from any suitable source, in the presence of the novel catalysts.

In general, it may be said that to accomplish the objects of the invention, it is a feature of the present invention to carry out the reaction under optimum reaction conditions in the presence of the novel catalysts. The reaction is preferably carried out at temperatures ranging from between about 0° F. and 120° F., under pressures ranging from about 0 lbs./sq. in. gauge to about 1200 lbs./sq. in. gauge. The reaction time may be between about 0.5 and about 3.5 hours. In general, and within limits, the longer the reaction time, the more completely saturated the final product becomes.

As reactants, it is desirable to use isobutane, isopentane, and similar low boiling isoparaffins as the paraffinic constituents of the reaction mixture, although higher boiling paraffins of six and seven carbon atoms per molecule may be employed. As the olefinic reactant, ethylene, propylene, n-butylenes, isobutylene, and similar normally gaseous hydrocarbons are particularly desirable. In place of the monomeric mono-olefins, it is desirable to use dimers, trimers, tetramers, etc., and higher polymers of these mono-olefins, the co-, cross- and inter-dimers, trimers, tetramers, etc., and analgous condensation products of these mono-olefins.

It is an essential, in the practice of the invention, that the feed stock contain at least one isoparaffin boiling below the boiling point of the desired final product fraction and that the feed stock contain at least one mono-olefin. The molecular proportions of isoparaffin to olefin may vary widely, i. e., say from about an equimolecular ratio to a ratio of about 30 to 1. Ordinarily, a 10 or 11:1 ratio is preferred.

The process of the invention may be fully realized in either a batch operation or in a continuous process. It is essential, to attain the production of high yields of saturated $C_5$—$C_8$ product, to have intimate contact between the catalysts and the reactants. In the case of batch operation, vigorous mechanical stirring is adequate. In continuous operations, the reactants should be placed under sufficient pressure to keep them in a liquid state since they are then more easily continuously fed and dispersed into the reactor, containing one of the novel catalysts, by means of jets, porous thimbles, turbo mixers, etc. The product may be continuously withdrawn from the top of the reactor.

It has also been found that higher yields are possible, particularly so in the continuous process operation, if the C9+ (heavier condensation) products are at least partially returned to the original reaction zone after first being separated from the C5—C8 products desired. Also, any unreacted reactants or light fractions may be returned to the original alkylation zone.

The chief novelty of the invention lies in the discovery that catalysts composed of an oxide of an element of group V of the periodic system and a concentrated sulfuric acid act as new and unexpectedly useful promoters of the alkylation reaction. In place of the conventional sulfuric acid alkylation or polymerization catalyst, it has been found that $P_2O_5$, $V_2O_5$, $N_2O_5$, or $As_2O_5$, when mixed with concentrated $H_2SO_4$, possess the unusually valuable ability of catalyzing the reaction with the result that saturated octanes may be produced in even greater yields than has heretofore been possible and the octane number of such a C8 fraction or a C5—C8 fraction resulting from such a reaction shows a marked improvement over prior analogous processes and catalysts. The yield of C5—C8 product also is materially increased.

Not only single oxides but mixtures of two or more of these oxides may be added to the sulfuric acid to catalyze the alkylation reaction. Thus a mixture of $P_2O_5$ and $V_2O_5$ in sulfuric acid may be used.

The catalyst may be prepared by mixing from between about 0.5% and about 20% by weight of $P_2O_5$, for example, into a sulfuric acid solution having a concentration between about 90% and about 108%, preferably 93–98%. After thorough mixing, the new catalyst is used in conventional manner in a conventional $H_2SO_4$ polymerization or alkylation type of apparatus to carry out the desired alkylation reaction.

No theories are advanced as to the mechanics or chemistry of operation, but it is possible that in 95% concentrated sulfuric acid the phosphorus pentoxide reacts to a certain extent with any water present in the sulfuric acid, thereby forming a small quantity of phosphoric acid. However desirable such a phenomenon may be is not known. It is known, however, that a mixture of phosphoric and sulfuric acids, or phosphorus pentoxide alone, gave extremely small, if any, amounts of alkylation products.

Experimental evidence points to the theory that the mechanism of the alkylation reaction involves the intermediate formation of polymers or copolymers by the mono-olefins followed by the degradation of these higher polymers and copolymers into an active or nascent state which permits their reaction with the paraffins present. The same mechanism appears to hold true where the reaction occurs between a preformed polymer or copolymer and a paraffin. It is to be distinctly understood that the invention is not limited to any theory of operation, and is restricted only insofar as indicated by the appended claims.

The following tabulation of data from comparative experiments clearly discloses the unexpected and unobvious results attained:

Table I

| Example | 1 | 2 | 3 | 4 | 5 | 6 | 7 | 8 | 9 |
|---|---|---|---|---|---|---|---|---|---|
| Catalyst | 95% $H_2SO_4$ | 95% $H_2SO_4$ | 15% $P_2O_5$ in 95% $H_2SO_4$ | $P_2O_5$ | 0.5% $V_2O_5$ in 93% $H_2SO_4$ | 15% $P_2O_5$ in 95% $H_2SO_4$ | 15% $P_2O_5$ in 95% $H_2SO_4$ | 15% $P_2O_5$ in 95% $H_2SO_4$ | 5.1% $P_2O_5$ in 98% $H_2SO_4$ |
| Grams active cat./100 g. feed | 95 | 90 | 85 | 11 | 106 | 100 | 94 | 155 | 101 |
| Reaction time, hrs | 0.5–2.0 | 0.5–2.0 | 0.3–2.3 | 2.2 | 0.5–2.0 | 0.7–2.5 | 0.7–2.5 | 2 | 0.5–2.5 |
| Temperature, °F | About 14 | 15–40 | 15–40 | 15 | 64–66 | 15–40 | 68–80 | 45–110 | 65–70 |
| Press. lbs./sq. in. gauge | 0 | 0 | 0 | 0 | 29 | 0 | 30–35 | 35–110 | 45 |
| Feed: | | | | | | | | | |
| Weight percent isobutylene | 45.5 | | | | 19.7 | 48.6 | 19.6 | 38.7 | 19.6 |
| Weight percent n-butylene | | | | | 1.0 | | 1.0 | | 1.0 |
| Weight percent isobutane | 54.5 | 51.5 | 55.3 | 65 | 79.3 | 51.4 | 79.4 | 61.3 | 79.4 |
| Weight percent diisobutylene | | 48.5 | 44.7 | 35 | | | | | |
| Weight percent olefin reduction | 100 | | 99 | | 97 | 99.8 | 98 | 100 | 100 |
| C5+ product: | | | | | | | | | |
| Weight percent on olefins | 120 | 152 | 170 | 95 | 174 | 150 | 158 | 160 | 172 |
| Br. No. | 40 | 13 | 6 | 140 | 13 | 17 | 16 | 15 | 5 |
| Weight percent sats | 50 | 83 | 93 | 0 | 85 | 80 | 84 | 85 | 94 |
| Weight percent C5 | 5 | 6.5 | 7.5 | | 20.8 | 7.5 | 2.9 | 6.4 | 10.4 |
| Weight percent C6 | 7 | 8.5 | 7.5 | | | 7 | 5.7 | 6.8 | 8.5 |
| Weight percent C7 | 4 | 6.5 | .8 | | | 6 | 9.6 | 10.2 | 7.4 |
| Weight percent C8 | 14 | 20 | 38 | Unchanged diisobutylene | 42.7 | 26.5 | 34.4 | 31 | 38.9 |
| Weight percent C9 and heavier | 70 | 58.5 | 39 | | 36.5 | 53 | 47.4 | 45 | 32.4 |
| Octane number: | | | | | | | | | |
| C5 fraction | | | 91.2 | | | 91.2 | | | |
| C6 fraction | | | 90.6 | | | 90.6 | | | |
| C7 fraction | | | 89.4 | | | 89.4 | | | |
| C8 fraction | | 92 | 97 | | 88.8 | 90.5 | 98.8 | 88 | 89 |

Where a range of reaction time has been stated in the above table it is to be understood that the feed was added at 15-minute intervals while the last addition of feed was reacted from .3 to .7 of an hour or that the feed was added continuously over the reaction time, the last addition being reacted from .3 to .7 of an hour.

In Experiment 1, four additions of isobutylene were made at 30-minute intervals to make a total of 45.3% isobutylene added, and, in Experiments 2, 3 and 6, the olefin was added at about 15-minute intervals; this resulted in a range of contact time. In Experiment 8 the mixed hydrocarbon feed was added to the acid catalyst at the start of the experiment; difficulty in controlling the temperature was experienced. In Experiment 7, the olefin was added to the isobutane-acid mixture over a period of 80–100 minutes with much better control of temperature.

Example 6 shows a yield of total C5 and higher fractions of 150% as compared with 120% yield in Example 1, in which 96% $H_2SO_4$ was used as the catalyst. The C₈ content of Example 6 was 26.5%, using the new catalyst as compared with 14% using H₂SO₄ as the catalyst. The octane number of the C₈ fraction in Example 6 was 90.5.

Using a diisobutylene-isobutane feed, Examples 2 and 3 show that sulfuric acid gives 152% yield, on the basis of diisobutylene, of C₅ and heavier hydrocarbons, the new catalysts result in 170% yields of C₅ and heavier, based on the olefins used, and P₂O₅ (Example 4) alone gave no alkylation on the basis of dimer since no substantial amount of diisobutylene reacted. The C₈ contents of the product of Examples 2 and 3 were 20 and 38 respectively and the octane numbers of the fractions were 92 and 97 respectively.

The feed used in Examples 5, 7 and 9 was a refinery C₄-isobutane mixture.

Experiments represented by the data of Examples 1, 2 and 4 were carried out for purely comparative purposes and serve merely to more forcefully bring out the unexpected and unobvious advantages when using the novel catalysts.

In all of the examples, the reaction was conducted in batch operation with thorough mechanical stirring. It is, however, expressly within the scope of the present invention to carry out alkylation processes using the novel catalysts in a continuous manner.

The above examples are intended to be but illustrative of the invention and are not to be considered as in any way limiting the scope of the invention.

The nature and objects of the invention having been thus fully described, what is claimed as new and useful and desired to be secured by Letters Patent is:

1. A process which comprises alkylating acyclic paraffins containing at least one tertiary carbon atom with mono-olefins in the presence of a catalyst comprising at least one oxide of an element of the fifth group of the periodic system in concentrated sulfuric acid.

2. A process which comprises alkylating acyclic isoparaffins with mono-olefins in the presence of a catalyst comprising an oxide of an element of the fifth group of the periodic system in concentrated sulfuric acid.

3. A process which comprises alkylating an acyclic isoparaffin-mono-olefin mixture in the presence of a catalyst comprising between about 0.5% and about 20% of an oxide of an element of the fifth group of the periodic system in between about 90% and about 108% sulfuric acid.

4. Process as in claim 3 wherein the process is carried out at temperatures between about 0° F. and about 120° F. and at pressures between about 0 lbs./sq. in. gauge and about 1200 lbs./sq. in. gauge.

5. Process as in claim 3 wherein the process is carried out using a substantial molecular excess of the isoparaffin reactant and the total reaction time is between about 0.5 and about 3.5 hours.

6. Process as in claim 3 wherein the reaction is carried out in a continuous manner.

7. A process for the production of saturated liquid hydrocarbons boiling in the gasoline range which comprises reacting a mixture containing at least one low boiling acyclic isoparaffin with at least one member of the group consisting of normally gaseous mono-olefins, dimers, trimers, tetramers and higher polymers thereof, and analogous copolymers and cross-polymers thereof in the presence of concentrated sulfuric acid containing an oxide of an element of the fifth group of the periodic system.

8. Process as in claim 7 wherein the isoparaffin is present in an excess of between about 2:1 and about 30:1 over the amount of olefinic constituents present.

9. Process as in claim 7 wherein the oxide is phosphorus pentoxide and the mol ratio of isoparaffin to olefin is 10:1.

10. Process as in claim 7 wherein the catalyst is between about 93% and about 98% sulfuric acid containing between about 5% and about 15% by weight of phosphorus pentoxide.

11. In a process of catalytically alkylating acyclic paraffins containing at least one tertiary carbon atom with mono-olefins, the improvement which comprises carrying out the process in the presence of concentrated sulfuric acid containing an oxide of a metal of the fifth group of the periodic system.

12. A process which comprises alkylating a mixture containing isobutane and isobutylene in the presence of about 90% to about 98% sulfuric acid containing about 5 to about 15% phosphorus pentoxide.

13. A process which comprises alkylating a mixture containing isobutane and diisobutylene in the presence of about 95% sulfuric acid containing about 15% phosphorus pentoxide.

14. A process which comprises alkylating a mixture of isobutane and isobutylene in the presence of about 93% sulfuric acid containing about 0.5% of vanadium pentoxide.

15. A process which comprises reacting a mixture consisting of about 20% isobutylene and about 80% isobutane at between about 68° and about 80° F. under a gauge pressure of about 50 lbs./sq. in. for about 2.5 hours in the presence of about 95% sulfuric acid containing about 15% phosphorus pentoxide and recovering from the reacted mixture a fraction boiling within the desired gasoline boiling range.

16. A process which comprises reacting a mixture consisting of about 20% isobutylene and about 80% isobutane at between about 65 and about 70° F. under a gauge pressure of about 45 lbs./sq. in. for from about ½ to about 2½ hours in the presence of about 98% sulfuric acid containing about 5% phosphorus pentoxide and recovering from the reacted mixture a fraction boiling within the desired gasoline boiling range.

17. A process which comprises reacting a mixture consisting of about 20% isobutylene and about 80% isobutane at about 65° F. under a gauge pressure of about 50 lbs./sq. in. for about two hours in the presence of about 93% sulfuric acid containing about 0.5% of vanadium pentoxide and recovering from the reacted mixture a fraction boiling within the desired gasoline boiling range.

ELDON E. STAHLY.
ERWIN M. HATTOX.

DISCLAIMER 2,204,194.—*Eldon E. Stahly* and *Erwin M. Hattox*, Baton Rouge, La. ALKYLATION PROCESS. Patent dated June 11, 1940. Disclaimer filed January 22, 1944, by the assignee, *Standard Oil Development Company*.
Hereby enters this disclaimer to claims 1 and 2 of said Letters Patent.
[*Official Gazette February 22, 1944.*]